United States Patent
Churilla et al.

(10) Patent No.: US 8,490,487 B1
(45) Date of Patent: Jul. 23, 2013

(54) ACCELERATION SENSOR

(75) Inventors: John Churilla, Riverside, CA (US);
Bruce Campbell Glascock, Blue Jay, CA (US); Ronald John Nathan, Long Beach, CA (US)

(73) Assignee: Pacific Scientific Company, Duarte, CA (US)

( * ) Notice: Subject to any disclaimer, the term of this patent is extended or adjusted under 35 U.S.C. 154(b) by 292 days.

(21) Appl. No.: 13/019,804

(22) Filed: Feb. 2, 2011

Related U.S. Application Data

(60) Provisional application No. 61/301,089, filed on Feb. 3, 2010.

(51) Int. Cl.
*G01P 15/18* (2006.01)
*B60R 22/40* (2006.01)

(52) U.S. Cl.
USPC ..................... 73/514.37; 242/384.5

(58) Field of Classification Search
USPC .......... 73/514.01, 514.36, 514.37; 242/384.2, 242/384.5
See application file for complete search history.

(56) References Cited

U.S. PATENT DOCUMENTS

| | | | | |
|---|---|---|---|---|
| 3,963,193 A | * | 6/1976 | Higbee et al. | 242/384.1 |
| 4,087,059 A | * | 5/1978 | Lindblad | 242/384.4 |
| 4,801,105 A | | 1/1989 | Frisk | |
| 5,636,807 A | | 6/1997 | Warrick | |

* cited by examiner

*Primary Examiner* — John Chapman, Jr.
(74) *Attorney, Agent, or Firm* — Knobbe Martens Olson & Bear, LLP

(57) ABSTRACT

An omni-directional mechanical acceleration sensor is disclosed for use in applications including, but not limited to, vehicular seat belt systems, aircraft safety harness systems and initiation of airbag safety systems. The mechanical acceleration sensor incorporates at least two masses which, upon an acceleration event occurring, will cause a lever, to pivot thereby releasing the lever from engagement with an actuating means which would then initiate the applicable safety system.

14 Claims, 3 Drawing Sheets

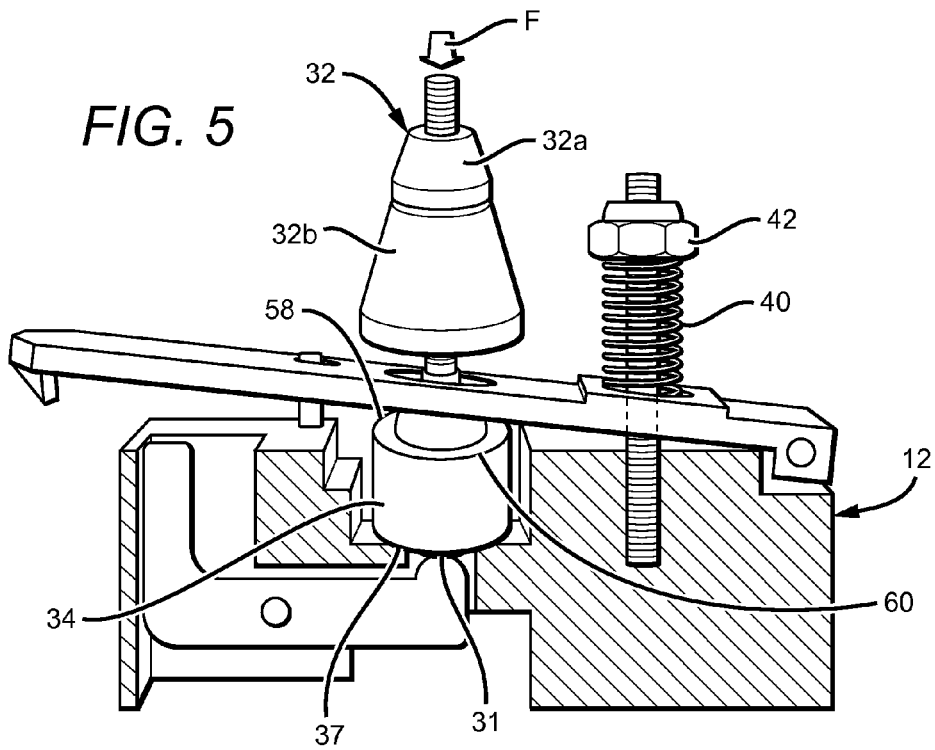
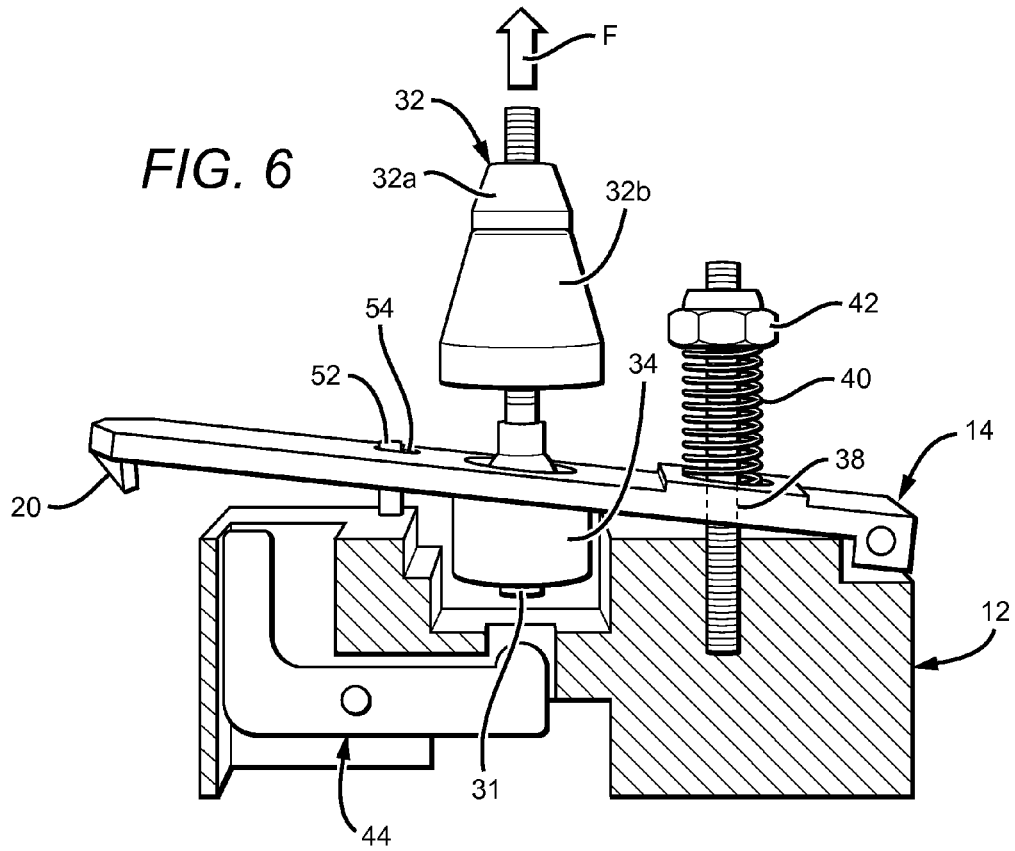

ACCELERATION SENSOR

CROSS REFERENCE TO RELATED APPLICATION

This application claims benefit to U.S. Provisional Application No. 61/301,089, filed Feb. 3, 2010, and which is incorporated by reference herein in its entirety for all purposes.

BACKGROUND OF THE INVENTION

The invention relates to omni-directional sensors and more specifically to mechanical omni-directional sensors which are suitable for applications such as seat belt restraints.

Acceleration sensors are used for many purposes. One widespread use is in automobiles for locking seat belts automatically upon detection of a predetermined positive or negative acceleration (deceleration). Such sensors are also used to inflate vehicular air bags when a specific, higher predetermined vehicle deceleration occurs.

One previous prior art design is disclosed in U.S. Pat. No. 5,636,807 issued to Warrick. This disclosure identifies a mechanical acceleration sensor that incorporates a heavy inertia mass suspended by two balls which are supported by two pivoting arms and supporting linkage.

Many automotive acceleration sensors have an inertia mass which senses acceleration in the generally horizontal directions of travel of the automobile. This mass can take the form of a tilting mass, a swinging pendulum, or a ball rolling up a ramp. In all, a mechanism responds to a predetermined movement of the mass to lock the reel which stores the belt webbing to prevent webbing payout.

Another application for deceleration sensors is to lock aircrew safety harness seat belt reels in response to aircraft acceleration. Since aircraft travel in multiple directions (combinations of vertical and horizontal), the automotive inertia mass movement types of sensors, described above, would be only partially effective, since they are limited in operability to sensing acceleration in generally horizontal directions, or in the plane of vehicle movement.

Most aircraft (and some automotive acceleration) sensors operate by sensing a predetermined acceleration of the storage reel as the harness webbing attempts to unreel from it. This results from aircraft movement which imposes unseating "G" forces on an aircrew member. These sensors sometimes use weights or masses which move sufficiently radially at a predetermined reel speed to actuate a locking mechanism.

Other aircraft sensors use an inertia mass connected to the reel by a screw mechanism. Acceleration of the reel by unwinding webbing accelerates the mass which, due to inertia, lags rotary movement of the reel. This relative motion turns the screw which moves a locking dog axially to engage the reel ratchet teeth and lock the reel. Such an aircraft acceleration sensor is illustrated in U.S. Pat. No. 4,801,105 issued to Frisk.

Such aircraft acceleration sensors do not react directly to vehicle acceleration, but only indirectly by reacting to resultant web and reel acceleration. Since they only indirectly respond to vehicle acceleration, they require some web payout to operate. Also, these types of sensors are use-specific, i.e. useful only with webbing reels or other reactive secondary movements, and cannot be utilized to perform other functions.

SUMMARY OF THE INVENTION

The disclosed device is an omni-directional mechanical acceleration sensor (hereafter referred to as "the acceleration sensor"), that can be used in applications where a mechanical output is desired resulting from a predetermined acceleration event acting on the sensor which may occur about any axis (X forward/aft, Y right to left and Z up and down) or combination thereof.

Preferably, the acceleration sensor can be operatively connected to either a means to inflate an airbag or to a locking means associated with a webbing reel or similar device, such as a spring-loaded plunger. The device operably connected to the acceleration sensor will be referred to hereafter as an "actuating means" and refers to embodiments known to those having ordinary skill in the art which can be operably connected to the acceleration sensor.

The acceleration sensor, upon a pre-determined acceleration rate or event being reached, will release itself from operative connection to the actuating means thereby causing the actuating means to perform its function; be it to engage the webbing reel or similar device and prevent further strap or seat belt unwinding, or inflate an airbag, etc. As defined herein, the term "predetermined acceleration event" means the threshold acceleration required to pivot the release lever to its activated position. Typically, the acceleration threshold is determined by the customer prior to assembling the sensor.

The disclosed acceleration sensor is designed to have a smaller footprint and be more reliable than prior art omni-directional mechanical sensors.

The acceleration sensor is capable of being positioned in any orientation. It comprises a pivotal release lever having a catch located at or near its distal end. Before an acceleration event occurs, the pivotal release lever remains in a first, non-activated position operably connected to the actuating means. Upon a predetermined acceleration event occurring, the release lever pivots to a second activated position which releases the actuating means from operable connection to the release lever.

In a preferred embodiment, the distal end of the release lever defines a catch which is the portion of the acceleration sensor operatively connected to the actuating means earlier described and the connection is released as the release lever pivots a predetermined distance to the activated position.

For situations where the actuating means refers to a seat belt harness system or the like and not to an airbag system, reconnection of the actuating means back to the acceleration sensor is possible. For example, once an acceleration event occurs and the release lever pivots releasing the actuating means from connection to the acceleration sensor, reconnection can occur preferably by manual movement of the actuating means back into operative connection with the sensor.

The catch is preferably designed with a tapered tip which allows the release lever to slightly pivot and allow the actuating means to slide back into operative connection with the release lever if displaced a sufficient distance. Also, the catch, rather than having its inner face being perpendicular to the release lever, has a slight negative angle that prevents creeping during random vibration events which might cause the release lever to pivot even through a predetermined acceleration event does not occur. The slight negative angle causes the release lever to be pulled back to the non-activated position. The catch is the part of the acceleration sensor which operatively connects to the actuating means.

The acceleration sensor has a release lever connected to a housing for pivoting from a non-activated position to an activated position and, at least one inertia mass which is operably connected to the release lever, where in response to a pre-determined acceleration event, the inertia mass will cause the release lever to pivot from the non-activated position to the activated position.

The acceleration sensor includes at least one inertial mass and at least one rocker mass positioned on opposing sides of the release lever. A stem is connected to the inertial mass and passes through a hole present in the rocker mass. A second pivot lever in combination with the inertia mass and stem is used to cause the release lever to pivot upon a predetermined acceleration event occurring in the +Z axis. The rocker mass is used to cause the release lever to pivot upon an acceleration event occurring in the X-Y plane or in the −Z axis. Accordingly, the rocker mass must have an appropriately sized surface or diameter which is sufficient to pivot the release lever in response to a predetermined acceleration event occurring. As defined herein, the Z axis refers to the axis along which the release lever pivots. FIG. 1 provides an x-y-z coordinate system relative to the acceleration sensor. It should be understood that although the figures are presented in a slight perspective view, this should not detract from interpreting how the coordinate system is described in this specification.

The hole present in the rocker mass is sufficient to allow the stem to slidably pass through for operable contact with the second pivot lever. However, the rocker mass must be responsive to the tilting of the inertial mass. In other words, too large a hole through the rocker mass may make the rocker mass unresponsive. In a situation where the inertial mass is tilted, the stem would act upon the top surface of the rocker mass to cause the rocker mass to correspondingly tilt. The stem is also designed to have an end which will engage the bottom of the rocker mass in −Z acceleration events as will be discussed later.

Thus, the release lever, which pivots along one axis, is made responsive to omni-directional acceleration events by being operably connected to a second lever and the rocker mass.

The center of gravity of the inertia mass is located further away from the release lever than is the center of gravity of the rocker mass. For a predetermined acceleration event to occur, the inertia mass will tip in one direction while the rocker mass, which sits on a portion of the sensor housing, will correspondingly tip, raising a top surface edge to contact the release lever and cause the release lever to pivot to a sufficient degree to release the catch. For other acceleration events, either: 1) the inertia mass, stem and rocker mass will act directly to raise the release lever (−Z axis); or, 2) the inertia mass and stem will cause the secondary pivotal lever to pivot and raise the release lever (+Z axis).

In a preferred embodiment, the disclosed acceleration sensor comprises: a housing; a release lever pivotally connected to the housing at its proximal end and having a catch at its distal end; an aperture present through the release lever; an inertia mass; a rocker mass; a stem connected on one side of the release lever to the inertia mass and where the stem passes through the release lever and through a central hole in a rocker mass positioned directly below the release lever and seated upon a portion of the housing; a second lever pivotally connected to the housing and having a proximal end in contact with the end of the stem and a distal end which is contactable with the release lever between aperture and distal end of the release lever; and, a device such as a calibration spring or the like operatively connected to the release lever for exerting a force upon the same side of the release lever as is the inertia mass (in the +Z axis). The force applied by the calibration spring is to ensure that the release lever will not pivot to the activated position unless an acceleration event occurs.

When an acceleration event occurs in any direction, the inertia mass will cause the release lever to displace from a first non-activated position, where the catch is in operative contact with the actuating means, and pivot upward to a second activated position, which is defined here as the position of the release lever when the catch releases from operative contact with the actuating means.

At the conclusion of the acceleration event, the inertia mass will return substantially to its original position and thereby cause the release lever to return to its first non-activated position. Where the sensor is used with a seat belt or harness system, upon activation, the harness or seat belt will typically remain in the locked position until the user manually displaces the actuating means away from engagement with the webbing reel, typically by use of a slidable handle, to slide the actuating means back into engagement or operative contact with the catch of the acceleration sensor.

Thus, the release lever, pivotally connected to a housing, is designed to pivot in response to an acceleration event in any direction from a first non-activated position to a second activated position. The release lever can be displaced into the second activated position by one of the following:

a) an acceleration event occurs when the inertia mass tips with sufficient force to correspondingly tip the rocker mass so that a portion of the top edge of the rocker mass contacts the release lever and overcomes the force applied to the release lever by the calibration spring and pivot the release lever;

b) an acceleration event occurs when the inertia mass and stem apply enough force upon the proximal end of the second lever to overcome the force applied to the release lever by the calibration spring and pivot the distal end of the second lever into contact with, and pivot the release lever;

c) an acceleration event occurs when the inertia mass and the rocker mass apply enough force to overcome the force applied to the release lever by the calibration spring and pivot the release lever;

d) a combination of a) and b); or, e) a combination of a) and c).

In preferred embodiments, the inertia mass and rocker mass of the disclosed acceleration sensor are constructed from a dense metal such as tungsten or brass. As a result, the mechanism can be designed with a higher gauge spring resulting in greater sensitivity for responding to an acceleration event.

The inertia mass can be designed in various configurations such as cylindrical although a conical shape is preferable.

Preferred embodiments include some type of alignment guide for ensuring that the release lever travels only in the pivot direction. Suitable alignment guides include, but are not limited to: a) elevated walls on either side of the release lever; or b) a hole appropriately sized and located on the release lever so that a dowel pin anchored to the housing, can extend through.

DESCRIPTION OF THE DRAWINGS

FIG. 5 illustrates the acceleration sensor in an activated position resulting from a second alternative acceleration event occurring in the +X axis;

FIG. 6 illustrates the acceleration sensor in an activated position resulting from an acceleration event occurring in the −Z axis.

DETAILED DESCRIPTION OF THE PREFERRED EMBODIMENT

Figure 1:
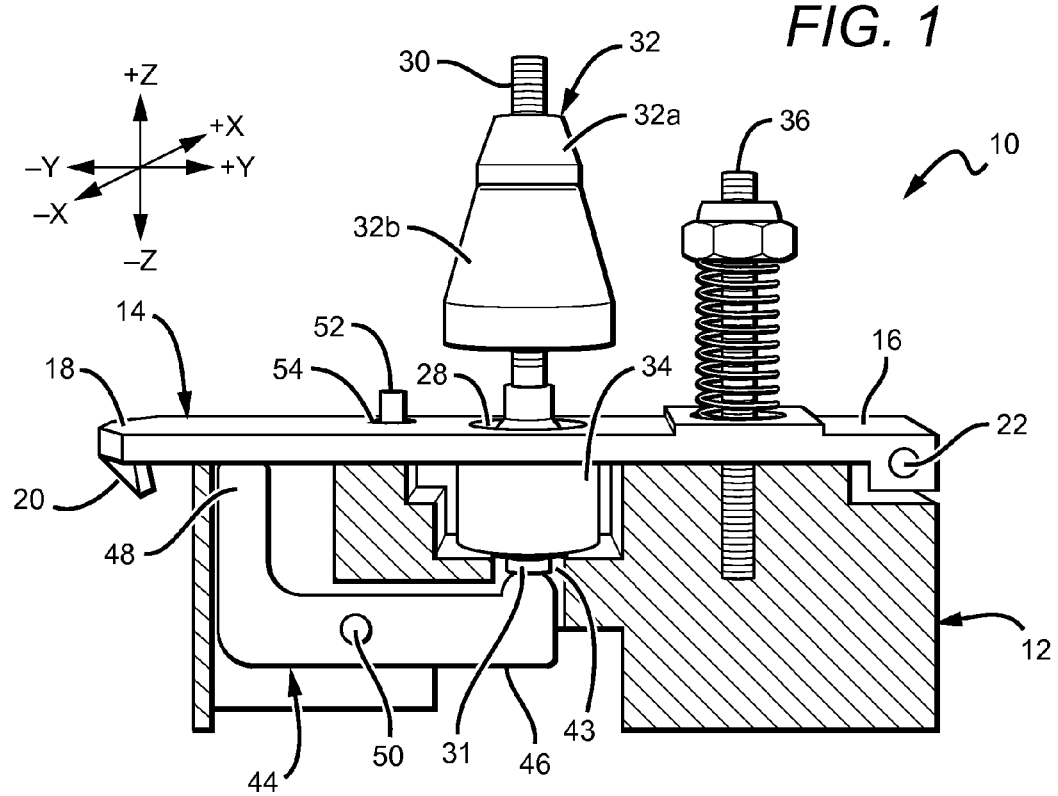
FIG. 1 illustrates the acceleration sensor in the non-activated position.

The acceleration sensor 10 is illustrated in FIG. 1 in the non-activated position.

Acceleration sensor 10 comprises a housing 12, an elongated release lever 14 having a proximal end 16 and a distal end 18 having a release catch or tooth 20. A pivot pin 22 pivotally mounts release lever 14 to housing 12. Release lever 14 further has an inward facing surface 24, an outward facing surface 26 and aperture 28.

Acceleration sensor 10 further comprises a stem 30 extending through aperture 28 and having an inertia mass 32 mounted adjacent to outward facing surface 26. Inertia mass 32 comprises top mass 32a and bottom mass 32b which create a jam nut to one another preventing further displacement along stem 30 once properly positioned on stem 30. A rocker mass 34 is positioned on the side of release lever 14 opposite inertia mass 32. Rocker mass 34 has a top surface 35 and a bottom surface 37. Stem 30 has a headed end 31. Rocker mass 34 has a hole of sufficient diameter which permits stem 30 to slide through while allowing rocker mass 34 to respond accordingly to the degree of tilt experienced by inertia mass 32.

To provide a counter force upon release lever 14, a rod 36 is threadably engaged to housing 12 on one end and extends through an aperture 38 in release lever 14. A calibration spring 40 is positioned about threaded rod 36, between an appropriately sized lock nut 42 threadably engaged to rod 36 and a counter bore in aperture 38. Lock nut 42 can be adjusted to alter the compressive force spring 40 exerts upon release lever 14 for urging release lever 14 to remain in the first non-activated position. Use of lock nut 42 prevents vehicular vibrations from reducing the compressive force set upon spring 40.

Acceleration sensor 10 also comprises a second lever 44 having a proximal end 46 and a distal end 48 and pivotally mounted by pivot pin 50 to housing 12. Rocker mass 34 is seated on housing portion 41 that has opening 43 for allowing the end of stem 30 to contact proximal end 46 of second lever 44.

Thusly, proximal end 46 is positioned for operable contact with stem 30 and inertia mass 32; and distal end 48 is positioned for operable contact with release lever 14.

Rocker mass 34 comprises an appropriately sized top surface area 35 adjacent to inward facing surface 24 of release lever 14. The appropriately sized top surface area 35 of rocker mass 34 means that in response to an acceleration event, a portion of top surface area 35 of rocker mass 34 will contact inward facing surface 24 with sufficient force to pivotally displace release lever 14.

Acceleration sensor 10 may also include an alignment guide to ensure reliable pivotable movement of release lever 14. In the preferred embodiment, the alignment guide comprises an appropriately sized dowel pin 52 secured to housing 12 and extending upward through aperture 54 on release lever 14. In another embodiment of an alignment guide, housing 12 can have elevated sides to maintain a proper pivot tract for release lever 14.

FIG. 1 illustrates acceleration sensor 10 in the non-activated position meaning that engagement tooth 20 is connected to an actuating means such as a spring-loaded plunger or the like which in turn is operatively connected to an inertia reel or other applicable system (not shown). In the non-activated position, the inertia reel operably connected to an actuating means is free to wind and unwind. However, in response to an acceleration event of a pre-determined magnitude, release lever 14, will pivot sufficiently to release tooth 20 from engagement with the actuating means which then locks an inertia reel (not shown).

In the preferred embodiment, a portion of the inside facing surface 24 of release lever 14 rests on housing 12 to prevent unnecessary movement.

Release lever 14 pivots about the pivot pin 22 and is held in a non-activated position by the force being applied by calibration spring 40 preventing a premature release of operative connection between tooth 20 and the actuating means (not shown). Tooth 20, rather than having its inner face being perpendicular to release lever 14, has a slight negative angle of approximately 2 degrees that prevents creeping during random vibration events which might cause release lever 14 to pivot even though a predetermined acceleration event does not occur. The slight negative angle urges release lever 14 to the non-activated position.

The sensitivity of the acceleration sensor 10 can be calibrated by increasing or decreasing the force exerted by spring 40 with nut 42. Depending on the specific acceleration event requested by the customer, the pivot point of second lever 44 to housing 12 will vary and the precise fulcrum point will be established at the design stage.

Sensitivity of acceleration sensor 10 can be calibrated by displacing inertia mass 32 higher or lower on stem 30. A slip fit hole exists between rocker mass 34 and stem 30 which allows stem 30 and inertia mass 32 to slide downward. The bottom end 31 of stem 30 is in contact with the proximal end 46 of second lever 44; this contact occurs because of a clearance hole 43 in housing 12 to allow the end of stem 30 to protrude for contact.

The force resulting from a predetermined acceleration event are designated as "F" in FIGS. 2-6 and illustrate how force F affects the operation of acceleration sensor 10 when applied in different directions.

Accelerations in X and Y plane

Figure 2:
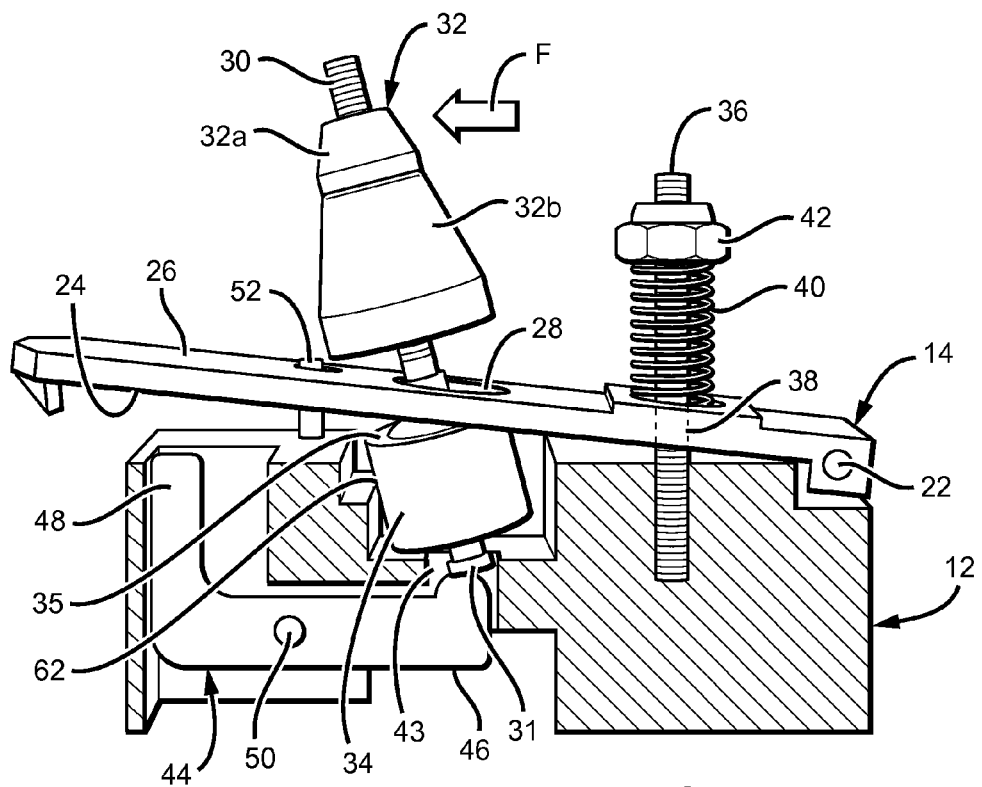
FIG. 2 illustrates the acceleration sensor in an activated position resulting from an acceleration event occurring in the +Y axis.
Figure 4:
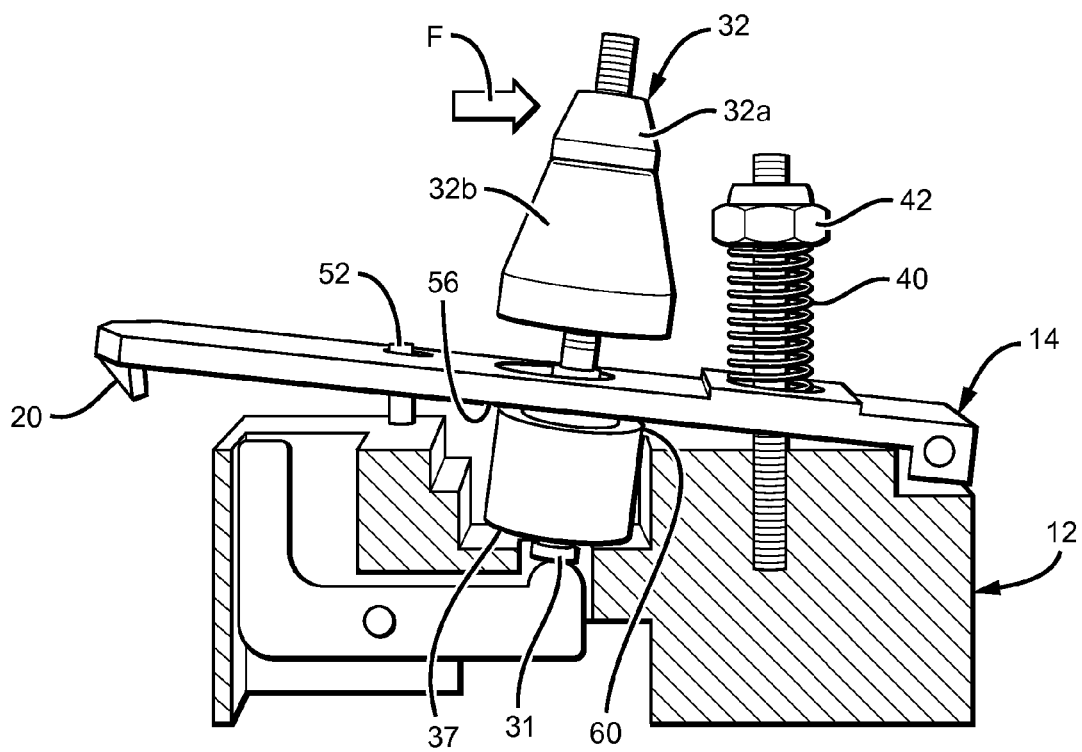
FIG. 4 illustrates the acceleration sensor in an activated position resulting from an alternative acceleration event occurring in the −Y axis.

For acceleration in the X and Y plane, inertia mass 32 tends to 'tip' as illustrated in FIG. 2, FIG. 4 or FIG. 5. This is due to inertia mass 32 being larger with respect to rocker mass 34. The tendency of inertia mass 32 to tip is enhanced by rocker mass 34 being positioned in a cup or spot face area of housing 12. As inertia mass 32 tips over, it causes release lever 14 to pivot to the activated position thus signaling that a predetermined acceleration event has occurred.

There is a leverage difference depending on whether: a) the top surface edge or lifting edge of rocker mass 34 which is closest to pivot pin 22; or, b) the top surface edge or lifting edge of rocker mass 34 which is furthest from pivot pin 22 contacts release lever 14.

Referring to FIG. 2 and FIG. 4, because a lever is used, more force is required to be applied at the contact of rocker mass 34 to release lever 14 in FIG. 2 than the force required to lift release lever 14 in FIG. 4.

In order to ensure that the same acceleration will trigger an event, the side walls of housing 12 adjacent to rocker mass 34 are designed so that in the direction where less force is required, i.e. in FIG. 4, the top portion of the sidewall of rocker mass 34 contacts the housing sidewall, the location of contact illustrated as tipping edge 60.

In the direction where more force is required, i.e. in FIG. 2, the middle portion of the sidewall of rocker mass 34 contacts the housing sidewall at a lower level than for the direction illustrated in FIG. 4. The location of contact illustrated as tipping edge 62.

An alternative embodiment to ensure pivoting of release lever 14 in an up and down direction is possible where, instead of the use of a dowel pin, raised sides are used to ensure a proper up and down track.

Accelerations in −Z Axis

FIG. 6 illustrates acceleration in the −Z axis. For acceleration in the −Z axis (minus Z), the inertia of stem 30, inertia mass 32 and rocker mass 34 and release lever 14 will react or pull upward on release lever 14 causing release lever 14 to move or rotate upward about pivot pin 22 thus signaling that the acceleration has met or exceeded the pre-determined set point.

Accelerations in +Z Axis

Figure 3:
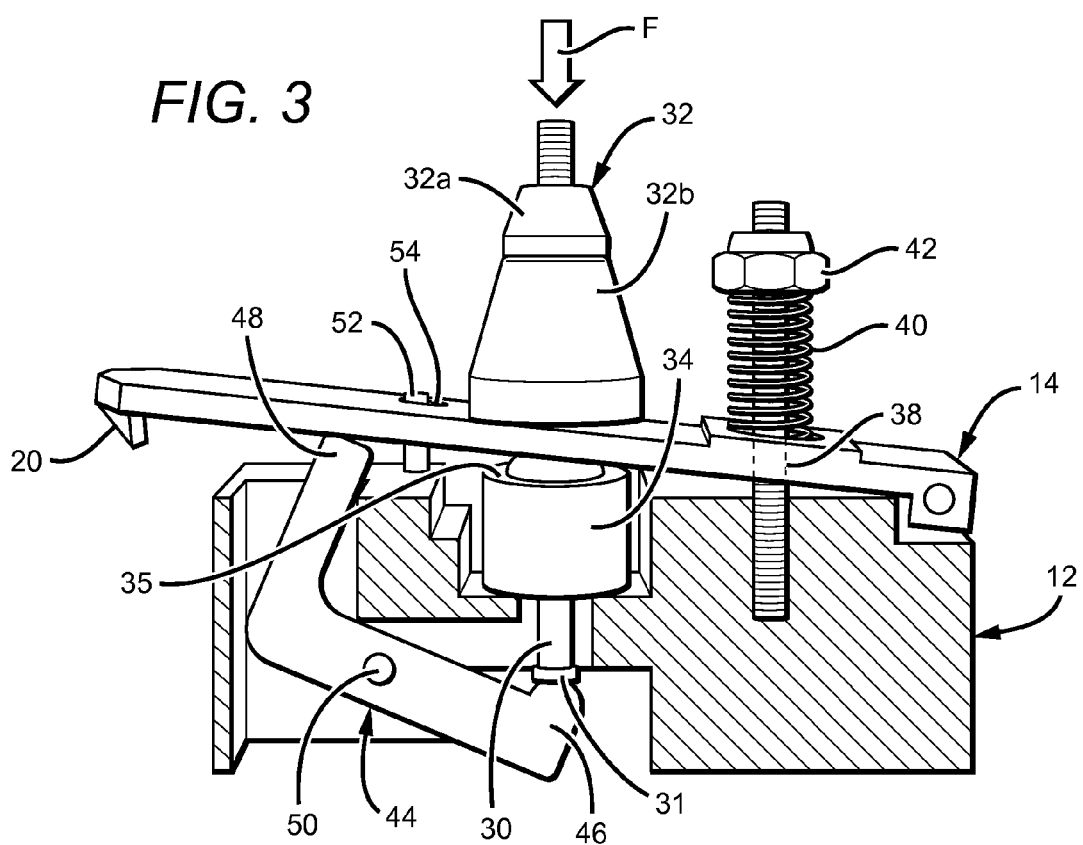
FIG. 3 illustrates the acceleration sensor in an activated position resulting from an acceleration event occurring in the +Z axis.

FIG. 3 illustrates acceleration in the +Z axis. For acceleration in the +Z (positive Z) the inertia of stem 30 and inertia mass 32 displace into operative contact with proximal end 46 of second lever 44. In response to this operative contact, second lever 44 rotates about second pivot pin 50 and distal end 48 of second lever 44 contacts inward facing surface 24 of release lever 14. If sufficient acceleration occurs which connotes a predetermined acceleration event, then sufficient force is applied in the +Z for distal end 48 to displace release lever 14 a sufficient distance to release the actuating means from contact with release catch 20.

In other words, in response to an acceleration event in the +Z direction, stem 30 can displace through a hole in rocker mass 34 until stem head 31 is in contact with proximal end 46 with sufficient force to pivot second lever 44 and distal end 48 into contact with release lever 14 and pivot release lever 14 from its non-activated position to a second activated position.

It is to be noted that in order for release lever 14 to pivot from the non-activated position illustrated in FIG. 1, to the activated position illustrated in FIG. 3, there must be a sufficient length of stem 30 between release lever 14 and the base of inertia mass 32 so that inertia mass 32 does not contact release lever 14 during a predetermined acceleration event in the +Z axis. In other words, stem 30 must have sufficient length from inertia mass 32 to pivot second lever 44 without inertia mass interfering with release lever 14 being able to pivot to the second activated position.

We claim:

1. An acceleration sensor comprising:
   a housing;
   a release lever having a proximal end and a distal end, said release lever pivotally mounted to said housing at said proximal end and configured to pivot from a first non-activated position to a second activated position; said release lever distal end further comprising a release catch; said release lever further comprising an outward facing surface, an inward facing surface and an aperture extending through said release lever;
   a calibration spring operatively attached to said housing and said release lever and configured to impart a predetermined force upon said release lever to maintain said release lever in said first non-activated position;
   a stem extending through said first level aperture;
   an inertia mass mounted to said stem adjacent to the outward facing surface;
   a rocker mass having a top surface, a bottom surface and a hole of sufficient diameter to allow said stem to be disposed through said rocker mass, said rocker mass seated on a portion of said housing, said housing portion further having an opening sized to allow stem displacement;
   a second lever having a proximal end and a distal end and pivotally mounted to said housing at a point between the proximal and distal ends of said second lever, said second lever proximal end positioned for operable contact with said stem, said second lever distal end positioned for operable contact with said release lever, said second lever configured to pivot such that the distal end of said second lever pivots said release lever from said first non-activated position to said second activated position in response to an acceleration event that displaces said stem into contact with said second lever proximal end with a force sufficient to pivot said second lever; and
   said rocker mass further comprising a substantially circular circumference having a diameter about its face opposing the inward face of said release lever, the release lever configured to pivot from said first non-activated position to said second activated position in response to an acceleration event that causes the inertia mass to tip and the rocker mass to contact the inward face of the release lever.

2. The acceleration sensor of claim 1 further comprising an alignment guide for ensuring reliable pivotable movement of said release lever.

3. The acceleration sensor of claim 2 wherein said alignment guide comprises elevated sides of said housing adjacent to the release lever.

4. The acceleration sensor of claim 2 wherein said alignment guide comprises a dowel hole in said release lever of sufficient size for accepting a dowel pin, and a dowel pin positioned on said housing disposed through said dowel hole.

5. An acceleration sensor comprising:
   a release lever for pivoting from a first non-activated position to a second activated position;
   an inertia mass;
   a stem where said inertia mass is connected to said stem;
   a rocker mass, the position of which is responsive to the position of said inertia mass except for accelerations in the +Z direction;
   a second lever positioned for operable contact with said stem and said release lever, the second lever configured to pivot the release lever from said first non-activated position to said second activated position in response to an acceleration event that displaces the stem into contact with the second lever; and
   said rocker mass having a surface facing said release lever that is configured to contact said release lever when the rocker mass is tilted as a result of an acceleration event, the release lever configured to pivot from said first non-activated position to said second activated position in response to an acceleration event that causes the inertia mass to tip and the rocker mass to contact the release lever.

6. The acceleration sensor of claim 5 further comprising a device for imparting a force upon said release lever to maintain said release lever in said first non-activated position until the occurrence of an acceleration event.

7. The acceleration sensor of claim 6 wherein said device for imparting a force upon said release lever is a calibration spring operatively attached to said housing and said release lever.

8. The acceleration sensor of claim 5 further comprising an alignment guide for ensuring reliable pivotable movement of said release lever.

9. The acceleration sensor of claim 8 wherein said alignment guide comprises elevated sides of said housing adjacent to the release lever.

10. The acceleration sensor of claim 8 wherein said alignment guide comprises a dowel hole in said release lever of sufficient size for accepting a dowel pin, and a dowel pin positioned on said housing disposed through said dowel hole.

11. A mechanical acceleration sensor for sensing an acceleration event occurring in any direction comprising:
   a housing;
   a release lever connected to said housing and configured to pivot from a non-activated position to an activated position; and,
   an inertia mass operably connected to said release lever, said inertia mass configured to cause said release lever to pivot from said non-activated position to said activated position in response to an acceleration event in any direction along six axes (+X, −X, +Y, −Y, +Z, −Z) or a combination thereof.

12. The mechanical acceleration sensor of claim 11 further comprising a device for imparting a force upon said release lever to maintain said release lever in said first non-activated position until the occurrence of an acceleration event.

13. The mechanical acceleration sensor of claim 12 wherein said device for imparting a force upon said release lever is a calibration spring operatively attached to said housing and said release lever.

14. The mechanical acceleration sensor of claim 11, wherein the housing is configured for installation in any orientation.

* * * * *

UNITED STATES PATENT AND TRADEMARK OFFICE
CERTIFICATE OF CORRECTION

| | |
|---|---|
| PATENT NO. | : 8,490,487 B1 |
| APPLICATION NO. | : 13/019804 |
| DATED | : July 23, 2013 |
| INVENTOR(S) | : John Churilla, Bruce Campbell Glascock and Ronald John Nathan |

It is certified that error appears in the above-identified patent and that said Letters Patent is hereby corrected as shown below:

In the Specification

At column 2, line 56, delete "through" and insert -- though --, therefor.

At column 6, line 37, below "contact." insert -- SENSOR Operation --, therefor.

Signed and Sealed this
Twentieth Day of May, 2014

Michelle K. Lee
*Deputy Director of the United States Patent and Trademark Office*